No. 658,821. Patented Oct. 2, 1900.
L. G. WOOLLEY.
ELECTRIC GENERATOR.
(Application filed Dec. 23, 1899.)
(No Model.)
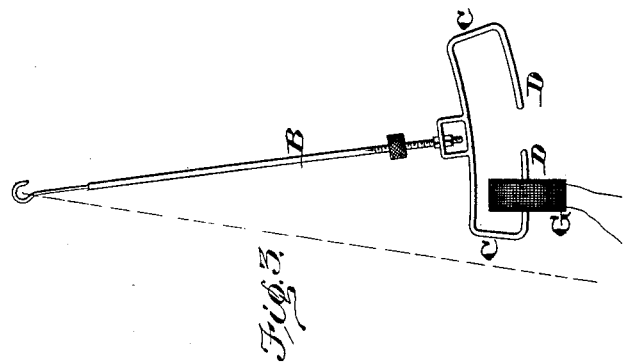
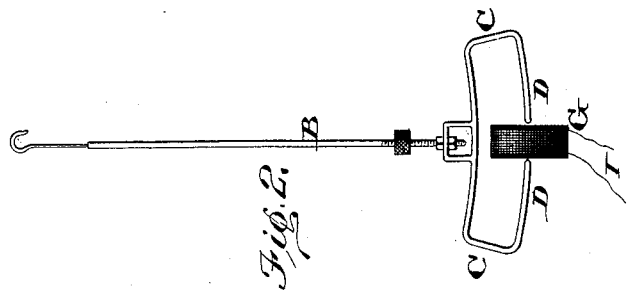
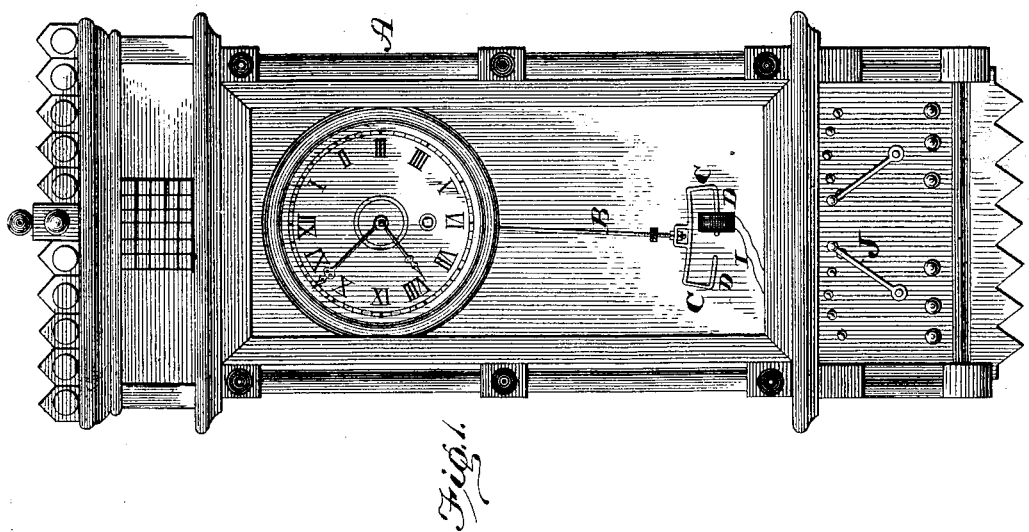
WITNESSES:
H. G. Dieterich
L. S. Black.
INVENTOR
Leonidas G. Woolley.

UNITED STATES PATENT OFFICE.

LEONIDAS G. WOOLLEY, OF KENTON, OHIO.

ELECTRIC GENERATOR.

SPECIFICATION forming part of Letters Patent No. 658,821, dated October 2, 1900.

Application filed December 28, 1899. Serial No. 741,816. (No model.)

*To all whom it may concern:*

Be it known that I, LEONIDAS G. WOOLLEY, a citizen of the United States, residing at Kenton, in the county of Hardin and State of Ohio, have invented certain new and useful Improvements in Electric Generators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in electric generators; and it consists in a pendulum having its lower end formed of a permanent magnet and which is preferably shaped so as to have two inwardly-extended arms, which form the pole-pieces, combined with a solenoid, through which the magnetic poles vibrate as the pendulum swings back and forth, so as to generate a feeble current, which is to be used for therapeutic and other purposes, as will be more fully described hereinafter.

The object of my invention is to provide an electric generator by means of which a feeble alternating current is generated and which is adapted to be used upon different portions of the body for therapeutic effects and for other purposes where a feeble alternating current is desirable.

In the accompanying drawings, which represent my invention, Figure 1 is a front elevation of one form of motor for operating my generator. Figs. 2 and 3 are detail views of the pendulum.

A represents a clock, of any suitable construction, and B the pendulum. The lower end of this pendulum is formed of a permanent magnet C, which is preferably shaped as shown, but which may be given other shapes, if so desired. As here shown, this pendulum is provided with two inwardly-extended arms D, which form the pole-pieces and which as the pendulum swings alternately pass into and through the solenoid G, as shown in Figs. 2 and 3. The poles are separated about the thickness of the solenoid, so that as one pole is leaving the other is entering, and thus the full effect of the positive and negative end of the permanent magnet in connection with the solenoid is obtained. As here shown, the solenoid is of ordinary construction and is wrapped with very fine wire of any suitable length, according to the current desired. The wires I extend from this solenoid to a rheostat J, by means of which the resistance in the circuit can be increased or decreased at will. The wires leading from the rheostat are to be attached by a belt, band, or any other suitable appliance to various parts of the body and produce a therapeutic effect; but should it be desired the current may be used for any other purpose where a feeble alternating current is needed.

As here shown, this generator is operated by an ordinary clock mechanism; but I do not restrict myself to the use of a clock in this connection. Any motive power which will operate the pendulum may be substituted for the clock and answer equally as well. By using a clock, as here shown, an ordinary timepiece may be available for generating a feeble current, which is adapted for many different purposes.

The permanent magnet serves not only as a magnet, but furnishes the necessary weight for the pendulum. As is here shown, the permanent magnet is made adjustable upon the pendulum B, and a weight is also used, and this weight is also made vertically adjustable to assist in regulating the movement of the pendulum. The magnet need not, however, be made adjustable, and the weight may be dispensed with, if so desired. One great advantage in having the permanent magnet attached to the end of the pendulum is that the solenoid being stationary a current is generated without the use of commutators or other similar devices which would interfere with the accurate movement of the pendulum.

Having thus described my invention, I claim—

1. In an electric generator, a motor, and a pendulum having its lower end formed of a permanent magnet, combined with a solenoid through which the ends of the magnet alternately pass, substantially as shown.

2. A motor, a pendulum having its lower end formed of a permanent magnet, and provided with two inwardly-extended arms or pole-pieces, combined with a solenoid, substantially as described.

3. In an electric generator, a motor, and a pendulum having its lower end formed of a permanent magnet, which magnet is provided with two separate arms, or inwardly-extended pole-pieces which are separated about the width of the solenoid, combined with the solenoid through which the pole-pieces vibrate, substantially as set forth.

4. In an electric generator, a motor, a pendulum having its lower end formed of a permanent magnet, and a solenoid through which the pole-pieces swing, combined with an adjustable weight applied to the pendulum for the purpose of forming a regulator, substantially as specified.

In testimony whereof I affix my signature in presence of two witnesses.

LEONIDAS G. WOOLLEY.

Witnesses:
  A. C. COONEY,
  J. A. WILKIN.